Feb. 23, 1954  J. W. STAFFORD  2,669,941
CONTINUOUS LIQUID PUMPING SYSTEM
Filed Dec. 15, 1949  2 Sheets-Sheet 1

INVENTOR.
JOHN W. STAFFORD
BY Hammond & Littell
ATTORNEYS

Feb. 23, 1954

J. W. STAFFORD 2,669,941

CONTINUOUS LIQUID PUMPING SYSTEM

Filed Dec. 15, 1949

INVENTOR.
John W. Stafford
BY
Hammond & Littell
ATTORNEYS

Patented Feb. 23, 1954

2,669,941

UNITED STATES PATENT OFFICE 2,669,941

CONTINUOUS LIQUID PUMPING SYSTEM

John W. Stafford, Hohokus, N. J.

Application December 15, 1949, Serial No. 133,119

6 Claims. (Cl. 103—241)

This invention relates to a new and improved continuously operative liquid pumping system of the type making use of two tanks which are filled alternately with liquid from a common supply line and are discharged under gas pressure into a common discharge line so as to maintain a continuous flow of liquid through the latter. Such a pumping system finds valuable industrial uses, for example, in delivering sugar juice treated with a decolorizing medium through filters under a pressure best suited for the filter operation.

A pumping system of the type mentioned is known in which the discharging and refilling of the respective tanks are effectuated automatically by the action of floats in the tanks, which operate slide valves on air intakes and vents of the respective tanks sequentially through interconnecting mechanical linkages so as to cut off the pumping air pressure from one tank and vent it simultaneously at a lower limit of movement of the float therein, after admitting compressed air to the other tank to start pumping from it, and so as to close the vent of either tank at an upper limit of movement of the float therein. See United States Patent No. 2,093,474.

In that known system complex mechanical constructions are required which limit the serviceability of the system and are costly to manufacture.

An object of the present invention is to provide a system of the type mentioned wherein only simple mechanical constructions are utilized at the two tanks, and in which control of the steps of operation may be effectuated through control mechanism remote from the tanks themselves. Another object is to provide a continuous pumping system which always maintains a steady flow of liquid under an even pressure, without objectionable surges of pressure in the discharge line.

According to one feature of this invention, two tanks adapted for a system of the type mentioned are each provided with a compressed air intake and a vent respectively having electrically actuated valves for opening and closing the same, and these valves are operated through electrical control mechanism away from the tanks in response to liquid level responsive motivating elements located at fixed upper and lower positions inside each tank, so as to maintain a continuous flow of liquid from the tanks through a common liquid discharge line.

According to another feature of the present invention, it has been found that objectionable surges of pressure in the discharge line of a system of the type mentioned may be avoided by operating air intake and vent valves on the respective tanks so that the vent of a tank nearing the end of its pumping operation is kept closed for a predetermined interval after the closing of the compressed air intake of this tank, and so that, at the time of such closing, the other tank has its vent closed and its compressed air intake opened to begin its pumping operation. In this way the full pressure of the air supply is always being admitted to one or the other of the two tanks, and a tank from which the compressed air supply has just been cut off continues nevertheless to discharge liquid under its internal air pressure for an interval during which the full pumping pressure is being built up in the other tank. A system embodying this improved operation may be obtained by providing adjustable time-delay relays among automatic switch units included in the electrical control mechanism above mentioned.

The foregoing and other objects, features and advantages of this invention will be apparent from the following detailed description and the accompanying drawings of a preferred embodiment thereof, while the structures or combinations and operations regarded as the invention will be defined in the appended claims.

In the drawings:

Fig. 2 is an enlarged wiring diagram indicating the functions and interconnections of units of the control mechanism.

Figure 1:
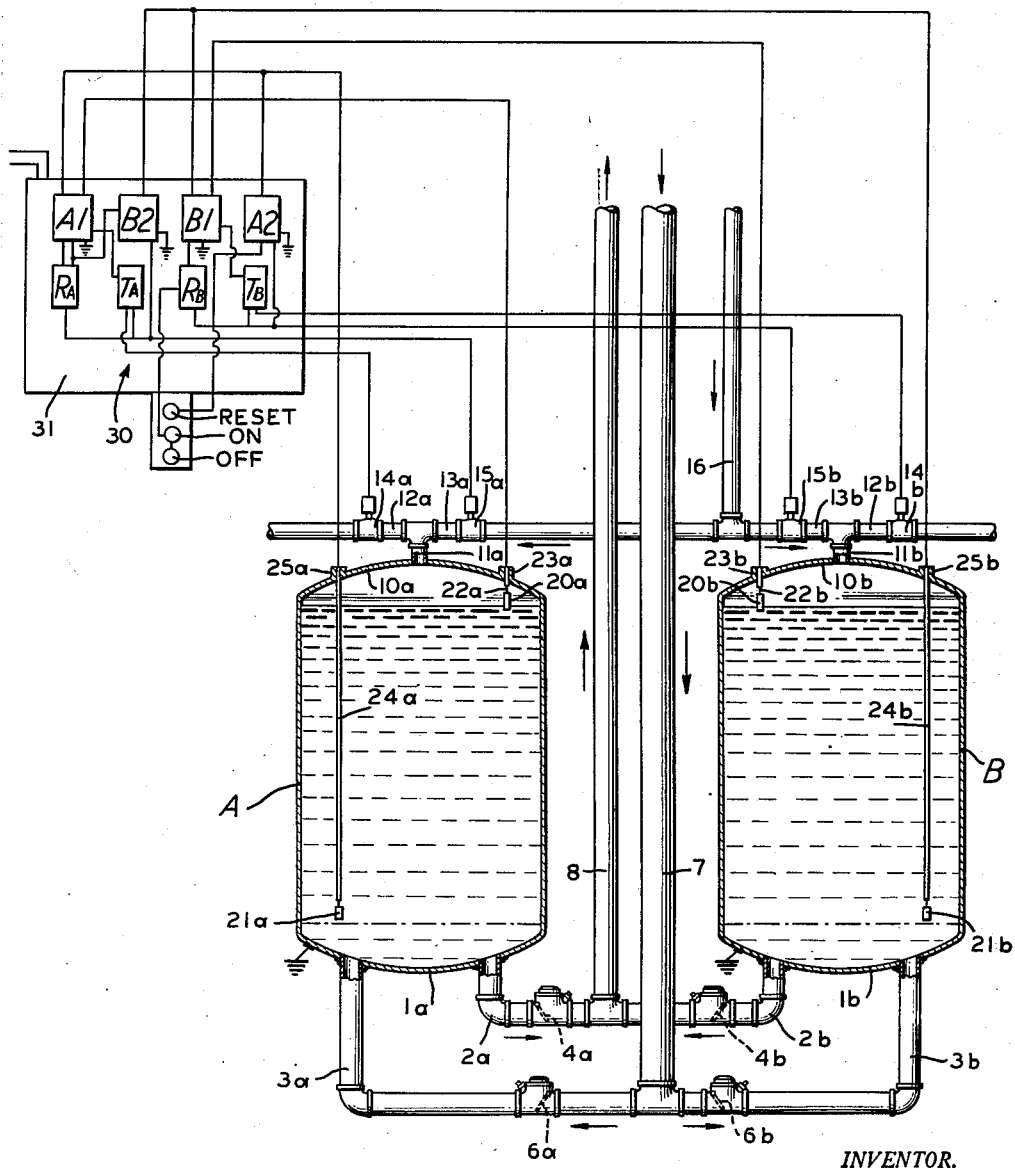
Fig. 1 is a schematic view of my continuous pumping system, showing the two tanks in vertical cross section and showing the connected electrical control mechanism in diagram on a separate panel.

As seen in Fig. 1, the system here provided makes use of two tanks A and B in side by side arrangement. From the bottoms *1a* and *1b* of these tanks extend discharge conduits *2a* and *2b*, respectively, and liquid feed conduits *3a* and *3b*, respectively. The discharge conduits contain check valves *4a* and *4b*, respectively, which open only in the directions away from the tanks, and beyond these check valves the two discharge conduits join with a common discharge line *8* by which the liquid pumped from the system is carried to a filter press or other point of treatment or use.

The liquid feed conduits contain check valves *6a* and *6b*, respectively, which open only in the directions toward the respective tanks A and B, and beyond these check valves the feed conduits join with a common liquid feed line *7* which extends from a source of feed liquid located above the pumping system so that the hydrostatic pressure of liquid in the feed line will produce flow through the check valve 6a or 6b, to fill the corresponding tank, when the tank is vented or free from counteracting internal pressure.

At the tops 10a and 10b of the respective tanks there are single air conduits 11a and 11b which have divergent branches 12a and 13a, and 12b and 13b, respectively. The branches 12a and 12b carry electrically actuated valves 14a and 14b and are vented to the atmosphere beyond these valves. The branches 13a and 13b carry electrically actuated valves 15a and 15b, and beyond these valves they are connected to a common compressed air supply line 16. Accordingly, the branch conduits 12a and 12b constitute vents of the respective tanks, which are closed when the respective valves 14a and 14b are closed; and the branch conduits 13a and 13b constitute air intakes of the respective tanks, through which compressed air passes into the tops of the tanks when the respective intake valves 15a and 15b are open. It results that when liquid is present in either tank and the intake valve of that tank is open, its vent being closed, the pressure of the compressed air supply will force the liquid through the check valve 4a or 4b of the corresponding liquid discharge conduit 2a or 2b, and thence into and through the common discharge line 8.

Any suitable form of electrically actuated valves may be used at 14a, 14b, 15a and 15b. Illustrated and preferred for this purpose are normally closed solenoid valves which move to open position when energized electrically and move to closed position, when deenergized, under the influence of springs in the valve units.

Located at fixed upper and lower positions inside tank A are liquid level response motivating elements 20a and 21a, which in this embodiment are electrically energized probes responsive to the electrical conductivity of liquid contacting the probes. For example, they may be probe elements of the commercial product known as a "Photoswitch Level Control Type 10CB1." Similarly located inside tank B are similar elements 20b and 21b. The elements 20a and 20b may be suspended in their desired positions, depending upon the limit desired for the high level of liquid in each tank, by rods or wires 22a and 22b extending from fittings 23a and 23b in the tops of the respective tanks; and the elements 21a and 21b may be suspended similarly by long rods or wires 24a and 24b from fittings 25a and 25b. Instead of the particular elements shown any other suitable type of fixed elements may be used that will serve to establish different electrical circuit conditions according to whether they are exposed above or are immersed in the liquid in the tank they serve.

As seen in the upper part of Fig. 1, an electrical control mechanism indicated generally at 30 is provided on a panel 31 located away from the tanks A and B at any suitable place. The several electrically actuated valves as well as the several liquid level responsive motivating elements are connected with this mechanism, which is organized so as to operate the valves sequentially in response to changes of liquid level affecting the motivating elements in each tank.

In general, the electrical control mechanism 30 comprises automatic switch units for the respective vent valves 14a and 14b, which deenergize and thus close the vent valve of either tank in response to contact of the liquid level in such tank with the upper motivating element 20a or 20b therein; together with further automatic switch units actuated through exposure of the lower motivating element 21a or 21b of either tank, to close the air intake valve 15a or 15b of the same tank and simultaneously open the other air intake valve, and to cause delayed opening of the vent valve 14a or 14b of the same tank. For the last mentioned purpose and in order to prevent surges of pressure in the discharge line 8, those further units include time-delay relays connected with the respective vent valves to hold the vent valve of either tank closed for a predetermined interval after the closing of the air intake valve of the same tank and the opening of the air intake of the other tank, and to open the same vent valve at the end of that interval so that the corresponding tank then begins to refill from the liquid feed line 7.

Further, the electrical control mechanism may also include a manual switch station having a contact element movable manually on and off to energize and deenergize the automatic switch means, the on movement serving at the start of use of the system to cause both tanks A and B to be filled from the feed line until their upper probe elements 20a and 20b are covered to close their vent valves 14a and 14b; and another contact element at the manual switch station is movable manually thereafter to open the air intake valve of one tank and thus start the pumping operations. Manual contacts or pushbuttons connected to function in this way may be provided not only at the control panel 31 but also, if desired, at any convenient location remote from the panel, for example, at a filter station to which liquid is pumped by the continuous pumping system, where it may be desired to discontinue or resume the operation of the pumping system.

Referring more particularly to Fig. 2, which shows details of the assembly 30 of Fig. 1, there are four level control relays A1, A2, B1 and B2 connected electrically with respective probe elements inside the two tanks. Each such relay may be of the type designated commercially as a "Photoswitch Level Control Type 10CB1" which, fundamentally, is an alternating current control that combines a probe circuit and transformer in a manner to operate a direct current relay through a rectifier. Closure of the probe circuit alters the magnetic field of the transformer in such a way that current is generated in the rectifier-relay circuit to energize the relay.

In addition, there are two simple relays RA and RB and two time delay relays TA and TB. The time delay relays may be of any suitable type whereby desired circuit changes can be effected within a few seconds after energizing either relay, the time delay depending on the setting selected. These relays conveniently are of a type known commercially by the name "Agastat," wherein delayed switch contact movement is obtained by bleeding air through an adjustable needle valve from a bellows moved by the relay arm.

Alternating current for energizing the various control elements is supplied through lines L1 and L2 from a suitable source of power when a master switch M in these lines is closed. Line L1 leads through contacts of a pushbutton marked "On" to the coils of the various relays or automatic switch elements. Line L2 leads directly to one terminal of each of the vent valves 14a and 14b, to coil terminals 2 and contacts 4 of level controls A1 and B1, and to coil terminals 2 of level controls A2 and B2. The "On" button contacts which energize the various relays may be opened to deenergize them by pressing an "Off" pushbutton. A "Reset" pushbutton also is provided in connection with an air valve of one tank, say valve 15b, and with a corresponding level control, such as contact 5 of control B1, for movement to start pumping operations after the tanks A and B have been filled.

Level control A1 is connected with both probes in tank A, as indicated in the diagram. It acts to hold contact A1-4 interconnected with either contact A1-3 or contact A1-5, depending upon whether the liquid level in tank A is low or high, i. e., whether the two probes 20a and 21a are exposed or immersed. When these two probes are immersed, L2 current passes through A1 contacts 4 and 5 to contact 3 of control B2 and to a normally open contact of relay RA. The other normally open RA contact is connected to one terminal of the air valve 15a of tank A and to one terminal of the RA relay coils. When the two probes in tank A are exposed, L2 current passes through A1 contacts 4 and 3 to the coil of timer TA, thus energizing the latter so that it proceeds after a predetermined interval, say two seconds, to open normally closed contacts TA-2, and to close normally open contacts TA-1 whereby L1 current is relayed to the vent valve of tank A to energize and open that valve.

Level control B1 has similar connections with the two probes of tank B, and it acts at the low and high level conditions in tank B, in the way described with reference to control A1, tank A and relays RA and TA, so as to furnish L2 current either through contact B1-3 to energize timer TB or through contact B1-5 to contact 4 of control A2 and to a normally open contact of relay RB. When TB is energized it proceeds after a predetermined time delay, say of two seconds, to open normally closed contacts TB-2 and to close normally open contacts TB-1 leading to the vent valve of tank B.

Level control A2 is connected with the lower probe 21a in tank A, and level control B2 is connected with the lower probe 21b in tank B. When either of these probes is exposed the corresponding control A2 or B2 interconnects its contacts 3 and 4, thereby transmitting L2 current to the air valve 15b or 15a and the holding relay RB or RA of the other or non-corresponding tank (assuming that the other tank is then full so that contacts 4 and 5 of its level control B1 or A1, as the case may be, are then interconnected).

The detailed operation of the system therefore is as follows:

Tanks A and B being empty, and it being desired to start continuous pumping operations from a supply of liquid present in and above feed line 7, an operator first closes master switch M to deliver current to the control mechanism and then pushes the "On" button to energize timers TA and TB which act after an interval to close contacts TA-1 and TB-1 and thus energize and open the two vent valves 14a and 14b. The timers are thus energized directly because, with the probes in both tanks exposed, the coil of TA receives L2 current through A1 contacts 3 and 4 and the coil of TB receives L2 current through B1 contacts 3 and 4.

Under the hydrostatic pressure in line 7 liquid flows through the check valves 6a and 6b into tanks A and B, until each tank has been filled to a high level where its upper probe closes circuit by contact with the liquid. Level control A1 then opens the circuit through its contacts 3 and 4 and interconnects its contacts 4 and 5, and the same action occurs in level control B1; so relays TA and TB are deenergized and the vent valves 14a and 14b close to stop the liquid inflow. Meanwhile, the contacts 3 and 4 of level controls A2 and B2 are also disconnected and contacts 4 and 5 of these controls are connected in response to the rise of liquid above the lower probe in each tank.

The tanks thus having been filled, the operator now presses the "Reset" button to start the continuous pumping operations, which begin from tank B. At this time the air valve 15b of tank B is supplied with L1 current through the normally closed TB contacts 2, and the "Reset" button contacts deliver to the same valve L2 current transmitted through B1 contacts 4 and 5 which became interconnected when tank B became full. The "Reset" button acts instantaneously to complete a circuit through contacts 4 and 5 of control B1 to the coil of relay RB, so that the latter becomes energized to hold valve 15b energized through a circuit including contacts RB1. Movement of "Reset" thereafter has no effect. With the admission of compressed air through valve 15b, the liquid in tank B is forced out through check valve 4b and the discharge line 8 to the filter press or other place of liquid treatment. Meanwhile, tank A stands idle but full and ready for use.

When the liquid in tank B falls below the lower probe 12b therein, the air valve 15a of tank A is opened immediately to start pumping liquid from tank A, the air valve 15b of tank B is closed immediately, and the timer TB moves to open the vent valve 14b of tank B only after the desired time delay. Upon the opening of vent valve 14b tank B proceeds to refill from line 7 as the liquid in tank A is being pumped out through line 8. The exposure of the tank B probes brings about these changes by causing level controls B1 and B2 to disconnect their respective 4 and 5 contacts and simultaneously interconnect their respective 3 and 4 contacts. The disconnection of B1 contacts 4 and 5 deenergizes relay RB which immediately opens contacts RB-1 to deenergize and close the air valve of tank B. The interconnection of B1 contacts 3 and 4 energizes relay TB, which acts after two seconds, for example, to close contacts TB-1 and thus energize and open the vent valve of tank B. The interconnection of B2 contacts 3 and 4 immediately energizes and opens the air valve of tank A (since that valve is already receiving L1 current through the normally closed contacts TA-2), and this also energizes relay RA so that it forms a holding circuit directly to the air valve of tank A from contact 5 of control A1.

The liquid rising in tank B normally reaches the high level therein, where probe 20b makes contacts, before tank A is emptied. The vent valve 14b of tank B then closes immediately, since control B1 then deenergizes contact B1-3 and relay TB to deenergize the vent valve. Although relay TB closes contacts TB-2 at this time, the connected air valve of tank B is not energized because the lower probe in tank A has yet to be exposed so as to connect contacts 3 and 4 of control A2. So tank A continues pumping while tank B stands full and ready to pump.

When the lower probe 21a in tank A is exposed, control A2 interconnects its contacts 3 and 4, thereby energizing and opening the air valve 15b of tank B to start pumping from that tank. At the same time level control A1 disconnects its contacts 4 and 5 and simultaneously interconnects its contacts 3 and 4, with the effect of immediately deenergizing RA and the air valve of tank A and energizing time relay TA, thus causing TA to energize and open the vent valve of tank A only after the preset time interval. So the pumping now proceeds from tank B, and after delivery from this tank is under way pressure is vented from tank A and it starts refilling from the supply line 7 through check valve 6a. By reason of the maintenance of internal gas pressure in an emptied tank during the interval set by the time delay relay, liquid continues to flow out of that tank and no objectionable surges occur in the liquid delivery line 8 as the other tank takes over the pumping work.

As described above in reference to tank B, tank A refills completely before tank B is empty. When the liquid in tank A makes contact with the upper probe 20a, level control A1 interconnects its 4 and 5 contacts instead of its 4 and 3 contacts, thereby deenergizing relay TA to close the vent valve 14a of tank A immediately, and supplying L2 current to contacts of level control B2 and relay RA so that the latter are in readiness to open and hold open the air valve 15a of tank A when B2 contacts 4 and 3 becomes connected in response to exposure of the lower probe 21b in tank B.

The exposure of that probe thus produces immediate pumping from refilled tank A and, in addition, energizes relay TB through interconnected B1 contacts 4 and 3 so as to deenergize and close the air valve 15b of tank B immediately and to cause delayed opening of the vent valve 14b of tank B. Pumping thus proceeds from tank A while tank B is refilled.

Accordingly, as each tank becomes empty the other tank stands refilled and immediately takes over the pumping work, and thus a continuous and even flow of liquid is maintained through the delivery line 8 under the air pressure established in air line 16. The system continues operating (assuming an unlimited supply of feed liquid from line 7) until such time as an interruption may be desired. At that time the operator simply pushes the "Off" button, which deenergizes and closes all the air and vent valves so that no further flow of liquid will occur. The pumping operations may be resumed at any time, however, by simply pushing the "On" button to reestablish valve opening circuits.

It will be understood that various alterations and substitutions may be made in details or elements of the embodiment described above and illustrated in the drawings without departing from the new features of construction and operation herein disclosed and claimed as my invention.

I claim:

1. A continuously operative liquid pumping system comprising two tanks each having separate conduits adapted respectively to take in liquid from and to discharge the liquid to a feed line and a discharge line common to the two tanks, each tank having at its top an intake for compressed air and a vent for releasing air pressure from the respective tank, the respective air intakes and vents having electrically actuated valves for opening and closing the same, liquid level responsive motivating elements at fixed upper and lower locations in each tank, and electrical control mechanism actuated by said elements to actuate the valves automatically in response to changes of liquid level affecting said elements and including means operative to open the air intake valve in one tank when the liquid level falls below the lower motivating element in the other tank and to open the vent valve in the other tank a predetermined time interval after the opening of the air intake valve in the one tank so as to maintain a continuous flow of liquid from the tanks through the discharge line.

2. A continuously operative liquid pumping system comprising two tanks each having separate conduits adapted respectively to take in liquid from and to discharge the liquid to a feed line and a discharge line common to the two tanks, each tank having at its top an intake for compressed air and a vent for releasing air pressure from the respective tank, the respective air intakes and vents having electrically actuated valves for opening and closing the same, liquid level responsive motivating elements at fixed upper and lower locations in each tank, and electrical control mechanism actuated by said elements to actuate said valves, said mechanism including automatic switch means for the respective vent valves actuated to close the vent valve of either tank in response to contact of the liquid level in the respective tank with the upper element therein, and respective automatic switch means responsive to said lower motivating elements upon the liquid level in either tank falling below the lower element therein to close the air intake valve of the respective tank and simultaneously open the air intake valve of the other tank and to cause opening of the vent valve of the respective tank a predetermined time interval thereafter.

3. A continuously operative liquid pumping system comprising two tanks each having separate conduits adapted respectively to take in liquid from and to discharge the liquid to a feed line and a discharge line common to the two tanks, each tank having at its top an intake for compressed air and a vent for releasing air pressure from the respective tank, the respective air intakes and vents having normally closed solenoid valves therein for opening and closing the same, electrical motivating elements responsive to electrical conductivity of the liquid located at fixed upper and lower positions in each tank, and electrical control mechanism connected with said elements and said solenoid valves to actuate the latter, said mechanism including automatic switch means for the respective vent valves actuated to deenergize the vent valve of either tank upon the liquid level in such tank contacting the upper element therein, and respective automatic switch means actuated upon the liquid level in either tank falling below the lower element therein to deenergize the air intake valve of the same tank and simultaneously energize the air intake valve of the other tank and to cause energization of the vent valve of the same tank, the last mentioned switch means including time-delay relays connected with the respective vent valves and actuated to hold open the circuit to the vent valve of either tank for a predetermined interval after the closing of the air intake of the same tank and the opening of the air intake of the other tank and acting to close such circuit at the end of said interval, the respective switch means first mentioned actuating the corresponding time-delay relays to open their respective circuits to the vent valves.

4. In a continuously operative liquid pumping system, two tanks each having separate liquid feed and liquid discharge conduits extending from its bottom for connection, respectively, with a liquid feed line and a liquid discharge line common to the two tanks, a check valve in each feed conduit opening toward the corresponding tank and a check valve in each discharge conduit opening away from the corresponding tank, an air conduit extending from the top of each tank having separate branches each provided with a solenoid valve for opening and closing the same, one branch of each air conduit being vented beyond its valve and the other branches of the respective air conduits extending beyond their valves for connection with a common compressed air supply line, liquid level responsive motivating elements at fixed upper and lower locations in each tank, and electrical control mechanism connected with said elements and said solenoid valves to actuate the latter automatically in response to liquid level changes affecting said elements, said mechanism including automatic switch means operative when the liquid level in either tank falls below the lower motivating element therein to close the solenoid valve on the air supply branch of the respective tank and simultaneously to open the solenoid valve on the air supply branch of the other tank and to open the solenoid valve on the vented branch of the respective tank a predetermined time interval thereafter so as to maintain a steady flow of liquid from the tanks into the discharge line.

5. A continuously operative liquid pumping system comprising two tanks each having separate conduits adapted respectively to take in liquid from and to discharge the liquid to a feed line and a discharge line common to the two tanks, each tank having at its top an intake for compressed air and a vent for releasing air pressure from the respective tank, the respective air intakes and vents having electrically actuated valves for opening and closing the same, liquid level responsive motivating elements at fixed upper and lower locations in each tank, and electrical control mechanism connected with said elements and said valves to actuate said valves, said mechanism including automatic switch means for the respective vent valves actuated to close the vent valve of either tank in response to contact of the liquid level in the respective tank with the upper element therein, and respective automatic switch means responsive to said lower motivating elements upon the liquid level in either tank falling below the lower element therein to close the air intake valve of the respective tank and simultaneously open the air intake valve of the other tank and to cause opening of the vent valve of the respective tank, the last mentioned switch means including time-delay relays connected with the respective vent valves to hold the vent of either tank closed for a predetermined interval after the closing of the air intake of the respective tank and the opening of the air intake of the other tank.

6. A continuously operative liquid pumping system comprising two tanks each having separate conduits adapted respectively to take in liquid from and to discharge the liquid to a feed line and a discharge line common to the two tanks, each tank having at its top an intake for compressed air and a vent for releasing air pressure from the respective tank, the respective air intakes and vents having electrically actuated valves for opening and closing the same, liquid level responsive motivating elements at fixed upper and lower locations in each tank, and electrical control mechanism actuated by said elements to actuate said valves, said mechanism including automatic switch means for the respective vent valves actuated to close the vent valve of either tank in response to contact of the liquid level in the respective tank with the upper element therein, and respective automatic switch means actuated upon the liquid level in either tank falling below the lower element therein to close the air intake valve of the respective tank and simultaneously open the air intake valve of the other tank and to cause opening of the vent valve of the respective tank, said mechanism also including a contact element movable manually to energize and deenergize the several automatic switch means and circuit connections through which movement of said contact element to energizing position opens both of said vent valves thereby causing both tanks to become filled from said feed line, and another contact element movable manually after said contact element is moved to energizing position to open the air intake valve of one tank to start the pumping operations.

JOHN W. STAFFORD.

References Cited in the file of this patent

UNITED STATES PATENTS

| Number | Name | Date |
|---|---|---|
| 992,711 | Freeman | May 16, 1911 |
| 1,025,079 | Wells | Apr. 30, 1912 |
| 1,591,318 | Johansen | July 6, 1926 |
| 2,093,474 | Okell | Sept. 21, 1937 |
| 2,300,039 | Yeomans | Oct. 27, 1942 |

FOREIGN PATENTS

| Number | Country | Date |
|---|---|---|
| 239,043 | Germany | Oct. 9, 1911 |